US007991653B2

(12) United States Patent
Factor et al.

(10) Patent No.: US 7,991,653 B2
(45) Date of Patent: *Aug. 2, 2011

(54) METHOD FOR ASSEMBLING AND SHIPPING AN ITEM IN A SECURE ENVIRONMENT

(75) Inventors: Ronald D. Factor, Houston, TX (US); William Robert Grimes, Kent, WA (US)

(73) Assignee: Airis Holdings, LLC, Houston, TX (US)

( * ) Notice: Subject to any disclaimer, the term of this patent is extended or adjusted under 35 U.S.C. 154(b) by 1119 days.

This patent is subject to a terminal disclaimer.

(21) Appl. No.: 11/733,049

(22) Filed: Apr. 9, 2007

(65) Prior Publication Data

US 2010/0030581 A1  Feb. 4, 2010

(51) Int. Cl.
*G06Q 40/00* (2006.01)
(52) U.S. Cl. .............................................. 705/28; 705/4
(58) Field of Classification Search ............ 705/4, 28; 235/375
See application file for complete search history.

(56) References Cited

U.S. PATENT DOCUMENTS

| 7,176,800 B2 | 2/2007 | Sajkowsky |
| 2004/0227630 A1 | 11/2004 | Shannon et al. |
| 2005/0283388 A1 | 12/2005 | Eberwine et al. |
| 2006/0145812 A1 | 7/2006 | Sajkowsky |

OTHER PUBLICATIONS

Barriers to the Success of 100% Maritime Cargo Container Scanning Final Report—ESD.10 Introduction to Technology and Policy R. Cirincione A.Cosmas C.Low J. Peck J. Wilds Jan. 2007.*

* cited by examiner

*Primary Examiner* — James A Kramer
*Assistant Examiner* — James A Vezeris
(74) *Attorney, Agent, or Firm* — Buskop Law Group, PC; Wendy Buskop

(57) ABSTRACT

A method for assembling and shipping an item using a security cleared space connected to a port authority, comprising the steps of: leasing the security cleared space to a user; obtaining at least one component for assembly of the at least one item; assembling the at least one component in the security cleared space; screening at least one person for entry to the security cleared space; readying the assembled item for shipment to a destination by entering data related to the assembled item into a processor with computer instructions that direct the processor to move the assembled item to a designated storage area or to an aircraft for shipment. A method for receiving an assembled item and disassembling the item into components for storage or shipment is also contemplated.

26 Claims, 5 Drawing Sheets

METHOD FOR ASSEMBLING AND SHIPPING AN ITEM IN A SECURE ENVIRONMENT

FIELD

The present embodiments relate to a method for assembling and shipping an item using a security cleared space connected to a port authority, and to a method for receiving an assembled item, disassembling the item, and shipping the screened components using a security cleared space connected to a port authority.

BACKGROUND

A need exists for a method for ensuring safety and compliance with United States Transportation Security Administration and International Air Transport Association requirements that allows for the assembly of items within a security cleared area and shipment of the items from the security cleared area.

A further need exists for a method for ensuring safety and compliance with International Air Transport Association and United States Transportation Security Administration requirements that allow for the receipt of assembled items, disassembly of items within a security cleared area, and shipment of the components from the security cleared area There exists a need for a assembly facility integrated with a cargo terminal to improve on-time delivery and reduce inventory storage. The integration of assembly facilities with a port authority, including an aircraft terminal, will be further enhanced by the introduction of a sophisticated information linkage between handling systems. Manufacturers will immediately be able to track the status of shipments and schedule their activities accordingly.

There exists a need for a security cleared assembly facility connected to a port authority that will reduce the number of errors in the delivery cycle, reduce damage to sub-assemblies and finished products, and will reduce handling costs.

There further exists a need for a security cleared assembly facility connected to a port authority that will control the flow of good, achieve a higher quality of service, and will optimize transport security between the assembly facility and the cargo facility.

The present embodiments meet these needs.

BRIEF DESCRIPTION OF THE DRAWINGS

The detailed description will be better understood in conjunction with the accompanying drawings as follows.

Figure 1:
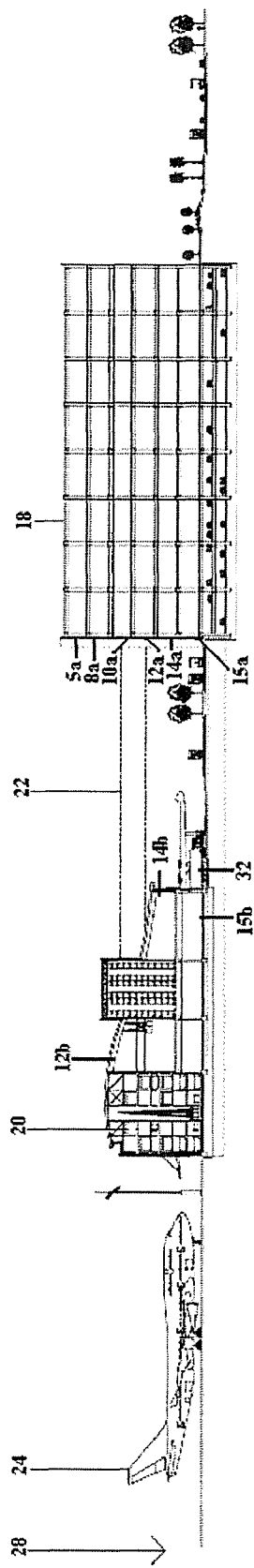
FIG. 1 depicts an axonometric view of the security cleared space for use herein with an aircraft connected to one of the security cleared buildings.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

Traditionally, product assembly facilities are not located immediately adjacent port authorities, primarily due to high land costs. However, in today's hi-tech global environment of thinning margins and shrinking markets, manufacturers are seeking methods to eliminate every inefficiency from the supply line to reduce time and costs from product assembly and distribution to market. The present method integrates an assembly facility with a port authority cargo facility, via a sterile connecting system, thereby eliminating an expensive transport segment from the traditional supply chain, reducing both cost and risk.

The present method allows pre-manufactured parts and sub-assemblies to be delivered to a security cleared space for final assembly, or assembled items to be delivered for disassembly. Finished products or components are then shipped from the site via cargo carriers serving the adjacent port authority. This grants tremendous market reach to manufacturers and distributors utilizing the security cleared space for assembly or disassembly and shipping, while packaging the entire assembly and distribution process into a single, self-contained, closed-loop facility.

The present method provides enhanced security, utilizing a security cleared space.

Components and assembled items that enter the security cleared space are screened according to United States Transportation Security Administration and International Air Transport Association requirements, including Regulations (EU) 2320/2002, 622/2003, 1138/2004, 781/2004, 831/2006, pending 49 CFR §1550 as of April of 2007, and the ECAC Policy Statement in the Field of Civil Aviation Facilitation, 8th Edition, as of January of 2001.

Persons that enter the security space are similarly screened, such as by using x-rays, air jet analyzers, metal detectors, and use of gamma rays for screening for drugs and other chemicals. Additionally, radioactivity detectors can be used. The present method also contemplates the screening of all vehicles connected to the security cleared space or that are allowed to enter the space in compliance with the above requirements as well, which may include thorough inspection of the vehicle, use of gamma rays as described previously, swabbing for explosives in the vehicles, or removing portions of the vehicle, such as removal and inspection of the contents of door panels.

An additional advantage of the present method is that the present method provides increased cost and time efficiency over conventional security measures and assembly practices.

Under the present method, the assembly or disassembly of items is performed on-site at a port authority, such as at an airport, and assembled or disassembled items can be shipped directly and immediately, reducing the time and costs related to handling and transporting assembled or disassembled items to a port authority for shipment.

The present method further allows for use of a single consolidated point for security clearance, so that all components, persons, and assembled and disassembled items can be screened and secured at a single location. This reduces costs and time required for security compliance, creating a lower price for customers, assemblers, and operators. The consolidated screening process is contemplated to be twice as fast as decentralized screening.

Another advantage of the present method is that the present method allows for the creation of a free trade zone, bonded storage, or assembly facility by a customs agency. This allows for the reduction or elimination of all import and export tariffs relating to components and items delivered to or shipped from the security cleared space.

Aircraft or other vehicles, such as ships, trucks, and other conveyance means, are connected with the security cleared space throughout the process, further improving the efficiency of the present method by allowing for direct and immediate transport of items to and from vehicles connected to the site. The security cleared space can also allow for the manufacture of components in addition to the assembly of components, negating a need for separate manufacturing sites and additional screening to transport manufactured components into the security cleared space.

The present method can further be adapted to efficiently be performed using automated means. A computerized process can move assembled or disassembled items into storage or into an aircraft or other vehicles for automatic shipment.

The present method can use labels, such as scannable bar codes or radio frequency identification tags, to further enhance efficiency and to facilitate the automation of one or more steps of the method. Manifests, clearance forms, labels, or similar documentation can be scanned and transmitted while a shipment is en-route, further increasing the efficiency of the present method.

The port authority as referred to in these embodiments can be an airport, a military post, a ship terminal, a rail facility or terminal, ferry terminals, trucking facilities, other intermodal facilities, and other similar facilities whether public or private.

The present method begins by leasing a security cleared space to a user. The security cleared space can be any kind of space, such as a designated space enclosed by walls and gates, an open area designated by markings on the wall and floors, a building, a temporary building, an inflatable structure, a pre-manufactured building, or other similar structures or areas.

In an embodiment, the security cleared space can be a pair of connected, multilevel buildings, wherein the air side building receives delivered components and assembled items, such as from an aircraft, which are transferred to a designated area of the non-air side building for assembly or disassembly. Finished products are then transferred to the air side building for shipment.

Multiple buildings can be connected using elevated connections, such as bridges or skyways, surface connections, such as ground level hallways, covered walkways, sidewalks, or doors, or underground connections such as tunnels. Likewise, aircraft and other vehicles can load and unload cargo into air side buildings using elevated connections, surface connections, or underground connections.

Single story buildings containing multiple areas, facilities, or zones within the single story can be used. It is contemplated to use buildings of any height with any number of stories, including from three to ten levels of lease space. It is further contemplated that the height and number of levels within each building can be governed by aeronautical height restrictions. Levels can include parking areas, truck docks, assembly or disassembly areas, pallet build up and break down areas, storage areas, vertical and horizontal conveyance systems, and other areas and equipment.

It is contemplated that individual levels of a building can be leased to different individual users. It is also contemplated that individual assembly or disassembly areas within a single level of a building can be leased to different individual users. Any combination of levels and assembly areas can be leased to any combination of users.

The security cleared space can be leased to a user, such as a manufacturing company, such as a computer or a cell phone manufacturer, an assembly company, a distribution company, such as an automobile parts or medical equipment distributor, an individual, a partnership, an association or other business organization, such as a pharmaceutical or nonprofit organization. The security cleared space can be connected a port authority, such as an airport, a seaport or ship terminal, a rail depot or terminal, a truck depot, and other similar conveyance areas, and can qualify as a secured area meeting United States Transportation Security Administration and International Air Transport Association requirements for cargo security policies.

It is further contemplated that the security cleared space can be custom designed for a particular assembly purpose, such as to meet the needs of a particular electronics or garment manufacturer. For example, the assembly or disassembly of ski clothing containing I-pods™ within a sleeve, which constitutes a high value, time-sensitive, seasonal product, may require various modification or customization of a security cleared space.

The present method then includes screening at least one person for entry to the security cleared space. It is contemplated that the screening of the one or more persons can be done according to United States Transportation Security Administration and International Air Transport Association requirements. The number of personnel working within the security cleared area can range from about 5 to about 5,000 or more depending upon the size and location of the area.

Personnel and persons can be a line operator, a manager, a foreman, a forklift operator, an administrator, a floor operator, a broker, a forwarder, a customs official, a treasury official, a drug enforcement agent and associated animals, a customs agent, a ground handling operator, a medical personnel, an engineer, a building engineer, a safety personnel, a leasing agent, an airport authority administrator, an airline official, a pilot or crew member, a load manager, a ramp operator, a ramp manager, a life, safety, and code compliance official, a security officer, a police officer, a food delivery personnel, a cleaning personnel, a United States Department of Agriculture personnel, other similar persons, and combinations thereof.

The present method then includes obtaining one or more components, which can be raw materials such as silicon to make silicon chips, for assembly of at least one item, such as a DVD. Components can be obtained through delivery from vessels, such as land based, sea based, or air based vessels, from storage within the security cleared site, or components can be manufactured within the security cleared site. It is contemplated that each component can be screened according to United States Transportation Security Administration and International Air Transport Association requirements prior to its entry into the security cleared space.

The present method further includes assembling the one or more components in the security cleared space, and creating at least one assembled item. The assembly of the assembled item can be done by creating an assembly line in the security cleared area, or through other means. The assembly can be performed using any conventional tools, processes, personnel, or steps necessary to create the assembled item, such as a conveyor belt or a power roller deck. A conveyor system could use smart pallets and a wireless network to communicate with personnel, identify parts and locations within the security cleared space, and promote the assembly process within the secure environment.

The present method then includes readying the at least one assembled item for shipment to a destination. This can be done by entering data related to the assembled item into a processor. Entered data can be a bar code or serial number relating to the assembled item, destination coordinates for the assembled item, check digits for storage locations, similar information, or combinations thereof.

The processor can be connected to a network, such as the Internet, a local area network, a wide area network, a cellular network, a satellite network, a fiber optic network, a telephone system, or combinations thereof. The network can be encrypted and secure. A single network can be in communication with all levels and all users of the security cleared space, individual networks can be in communication with individual users, or any combination of networks can be in communication with any combination of levels and assembly areas. It is contemplated that the network can have secure log in means, password protection, and can include possible biometric files, such as voice print, retinal, or fingerprint files for users to ensure enhanced security.

The processor can have data storage, such as a hard drive or any other type of readable computer media, with computer instructions that instruct the processor to move an assembled item or disassembled components directly to a designated storage area within the security cleared space or to an aircraft or other vehicle connected to the security cleared space in compliance with United States Transportation Security Administration and International Air Transport Association requirements In an embodiment, the movement of the assembled item to the aircraft or other vehicle, or to the designated storage area, can be done by an automated process. The automated process can include using an automated storage and retrieval module (ASRM), such as those made by Seimens Dematic from Germany and the United States, an elevating tracked vehicle (ETV), such as those made by Mitsubishi of Japan, power rollers or power ball decks, such as those made by Lödige of Germany, a tracked vehicle (TV), such as a trailer on rails or inlaid track or a tracked vehicle manufactured by Mannesmann of Germany.

It is contemplated that the processor can further include computer instructions for receiving data related to the assembled item or disassembled item or the one or more components from the network.

Data of this type can include a bar code or serial number relating to the assembled item, destination coordinates, shipping dates, shipping methods, insured value, quantity, owner, shipper, forwarder, customs information, hazardous cargo information, similar types of information, and combinations thereof. The data relating to assembled and disassembled items can also include a location of the item within the security cleared space.

Some of the data can be presented in a manifest. Traditional manifests have failed to identify a specific floor or a zone within a building which an item is to be delivered or located. The present method allows a user operator or shipper to identify in the manifest the precise location of screened and cleared items, whether they are components, assembled items or disassembled items.

The data can also include information for an airway bill, which typically includes United States Federal Aviation Administration data for shipping the components, assembled item, or item for disassembly.

It is further contemplated that at least two gateway protocols can be used to receive data related to the assembled item or the components from at least two devices on the network.

Devices used to receive data can include personal digital assistants, cellular telephones, computers, including laptop computers, a graphical user interface connected to the processor, or combinations thereof.

In an embodiment, each of the assembled items, or a group of packaged assembled items can be labeled, using at least one label. The label can be a bar code, a radio frequency identification tag, a check character, text, other similar labels, or combinations thereof.

In this embodiment, the method can further include scanning the label to initiate insurance coverage from one or more insurance carriers. Insurance coverage could cover a manufacturer, an assembler, a broker, a forwarder, a shipper, a carrier, a customer, other individuals, or combinations thereof.

It is contemplated that the method can also include additional steps required by insurance carriers to obtain insurance coverage, such as submitting payment to initiate a shipping policy.

The one or more labels could also include a manifest clearance form for enabling clearing of the assembled item or a group of assembled items. In an embodiment, the manifest clearance form can be scanned while the assembled item or a group of assembled items are en-route from the security cleared space to a delivery point outside the security cleared space. The scanned manifest clearance form can be transmitted to the network and a designated internet protocol address.

It is also contemplated that the present method can include physically clearing a governmental customs inspection to enable the assembled item or a group of assembled items to pass from the security cleared space to an aircraft or other vehicle for shipment to a specific destination. The assembled item or group of assembled items could also pass from the security cleared area to the specific destination without use of an aircraft or vehicle. It is contemplated that present method can include additional steps required by the government to physically clear the governmental customs inspection, such as steps required by the United States Department of Agriculture for inspecting drugs and pharmaceuticals.

A specific destination can include a customer location, such as a residence or business office, a customer designated location, such as the customs bonded area at an airport, or other locations or addresses.

In an additional embodiment, the present method can include sealing the assembled item or a group of assembled items. Sealing can be performed using one or more aluminum metal containers, such as Unit Load Devices (ULD), one or more cargo pallets with nets, tamper proof tape, such as that made by 3M of Minnesota, one or more tamper proof crates, such as wooden crates, or combinations thereof.

Sealing of the assembled items prevents tampering of sealed items and allows personnel to quickly and visually determine whether or not one or more assembled items have been tampered with or damaged.

In another embodiment, the assembly of the components or disassembly of items can be performed by an automated assembly line using smart pallets and a computer controlled processing unit. It is contemplated that a personal computer could be used for a small operation, although one or more computers having greater computing power, such as a main frame, can be used for larger applications. Multiple servers connected over a network can also be used.

The present embodiments also relate to a method for receiving at least one assembled item arriving by aircraft, disassembling the assembled item, and shipping at least one component using a security cleared space connected to an airport.

The embodied method can then include readying the screened components for shipment to a destination. This can be done by entering data related to the screened components or the assembled item into a processor connected to a network.

The processor can include data storage with computer instructions that direct the processor to move the screened components directly to a designated storage area within the security cleared space, or to a vehicle, such as a truck, a ship, a boat, a car, a trailer, a train, a bike, a scooter, an aircraft, or another form of conveyance, connected to the security cleared space in compliance with United States Transportation Security Administration and International Air Transport Association requirements.

The data can be entered into computer instructions in memory connected to a processor or into data storage connected to a processor, wherein the processor can be further connected to a user input or client device, such as a laptop, a personal digital assistant, a cellular telephone, a pager, or other similar data input devices, such as a keyboard or a touch screen.

It is contemplated that these embodiments of the method can further include labeling each assembled item, each screened component, a group of screened components, or combinations thereof using at least one label. A label can be a bar code, a radio frequency identification tag, a check character, text, or combinations thereof.

This embodiment of the method can further include scanning the label to initiate insurance coverage for the screened components, as described previously.

The label can include a manifest clearance form for enabling clearing of the one or more screened components. The method can further include scanning the manifest clearance form while en-route from the security cleared space to a delivery point outside of the security cleared space by transmitting the scanned manifest clearance form to the network and a designated internet protocol address.

This embodiment of the present method can also include physically clearing a governmental customs inspection, thereby enabling the screened components to pass from the security cleared space to a vehicle for shipment to a specific destination, or to pass out of the security cleared space to a specific destination without use of a vehicle.

It is also contemplated that present method can include sealing the one or more screened components or a group of screened components. As described previously, sealing can include aluminum metal containers, cargo nets, tamper proof tape, tamper proof crates, or combinations thereof.

It is also contemplated that the disassembly of the screened components can be performed by an automated assembly line using smart pallets and a computer controlled processing unit.

Referring now to FIG. 1, FIG. 1 depicts a contemplated security cleared space adjacent an airport. The security cleared space can be space in a building or other facility adjacent a port authority, wherein aircraft, ships, or other vehicles can land or taxi proximate to a security cleared building, facility, or space for loading or unloading. The security cleared space can be a single zone within a security cleared building, or it can be a plurality of zones, as depicted in FIG. 1.

FIG. 1 depicts a security cleared space including two multiple floor buildings. Air side building 20 is depicted having floors 12*b*, 14*b*, and 15*b*. It is contemplated that an aircraft 24, or other vehicles can deliver components for assembly or assembled items for disassembly to air side building 20. Aircraft 24 can also ship components or items out of the security cleared space. Each of floors 12*b*, 14*b*, and 15*b* can be used for any purpose, including parking, storage, packaging, distribution, transport, and other purposes. Air side building 20 can have any number of floors.

Air side building 20 is connected to a non-air side building 18 via a secure connector bridge 22. While secure connector bridge 22 is depicted as an elevated skyway, secure connector bridge 22 can also be a surface-level walkway or hallway or an underground tunnel. Secure connector bridge 22 can include conveyor belts, power rollers, and similar equipment to facilitate transport of assembled or disassembled items between air side building 20 and non-air side building 18.

Non-air side building 18 is depicted having floors 5*a*, 8*a*, 10*a*, 12*a*, 14*a*, and 15*a*. Each of floors 5*a*, 8*a*, 10*a*, 12*a*, 14*a*, and 15*a* can include one or more assembly areas, parking areas, pallet buildup and breakdown areas, storage areas, receiving and shipping areas, and vertical conveyance systems for transporting assembled and disassembled items between floors. It is contemplated that individual floors and individual areas of floors can be leased to individual users. It is further contemplated that individual floors and individual areas of floors can be adapted and customized as needed for assembly and disassembly of specific items. Non-air side building 18 can have any number of floors.

While non-air side building 18 is depicted as a multilevel building, non-air side building 18 could also be a single story building containing multiple assembly and disassembly areas within the single story.

The security cleared space is depicted adjacent an airport runway 28. Airport runway 28 could also be a seaport, a truck or rail depot, or any other area where transportation and cargo vehicles can arrive and depart. Additional surface transport devices, such as truck 32, can be used to facilitate transport of assembled and disassembled items between air side building 20 and non-air side building 18. Additional vehicles, such as truck 32, can also be used to deliver items or components to the security cleared space and to ship items or components from the security cleared space.

Figure 2:
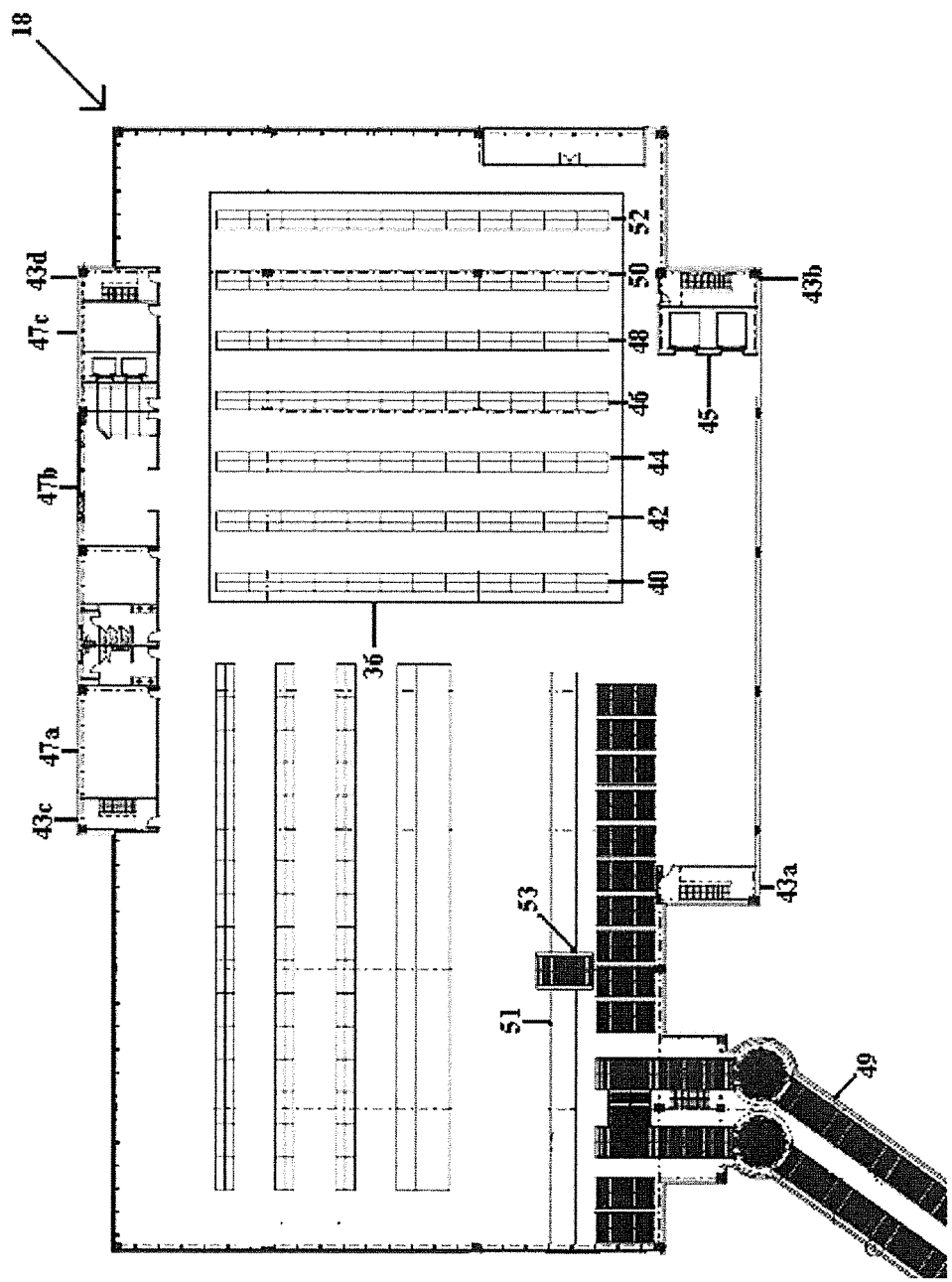
FIG. 2 depicts a detailed view of an assembly floor within a non-air side building of the security cleared space.

FIG. 2 depicts a contemplated interior of a level of non-air side building 18. An assembly area 36 for assembling items for shipment, is depicted. Assembly area 36 can also be a disassembly area. Assembly area 36 includes assembly lines 40, 42, 44, 46, 48, 50, and 52. Assembly lines 40, 42, 44, 46, 48, 50, and 52 can include assembly equipment, conveyer belts and power rollers, and other similar items for assembly or disassembly of items. One or more persons may individually or simultaneously operate or perform tasks at any of assembly lines 40, 42, 44, 46, 48, 50, and 52. It is also contemplated that one or more assembly steps can be performed using automated means and machinery. Each of assembly lines 40, 42, 44, 46, 48, 50, and 52 could independently assemble or disassemble identical or different items or components, or perform a single step in an assembly or disassembly process. The assembly area 36 could include groups of individual modules or similar groups of assembly stations that are connected together, either mechanically or electronically.

Persons for use on the assembly line can be employees of the user, independent contractors to the user, a temporary service providing temporary labor to the user, an employee leasing service, officers and directors or other executives of the user, or combinations thereof.

First conveyer belt 49 connects non-air side building 18 to air side building 20, depicted in FIG. 1. It is contemplated that first conveyer bell 49 can be integral to secure connector bridge 22, depicted in FIG. 1. First conveyer belt 49 can be used to transport items or components to and from non-air side building 18.

Second conveyer belt 51 is depicted transporting item 53 to assembly area 36. First conveyer belt 49 and second conveyer belt 51 can be separate conveyer belts, or connected. Any arrangement of conveyer belts or other machinery can be used to facilitate transport of items and components to and from non-air side building 18 and assembly area 36.

FIG. 2 also depicts adjacent areas 47a, 47b, and 47c. Adjacent areas 47a, 47b, and 47c can be used for storing items or components. Adjacent areas 47a, 47b, and 47c can also be pallet buildup and breakdown areas, additional assembly areas, truck docks or receiving areas, or locations for vertical conveyance systems. In a contemplated embodiment, adjacent areas 47a, 47b, and 47c can include elevators, stairways, or other connections to adjacent office space. The office space can be located on a separate office floor, or it can be located on the same floor as the related assembly area.

FIG. 2 further depicts vertical conveyance system 45, which can be any type of lift, elevator, including a freight elevator, or any other type of vertical conveyance system useable to transport items, components, groups of items, groups of components, pallets, packaged items and components, and other items and equipment between floors of non-airside building 18. It is contemplated that multiple vertical conveyance systems can be used. Any number of any type of vertical conveyance system could be used.

Stairways 43a, 43b, 43c, and 43d are also depicted. Stairways 43a, 43b, 43c, and 43d can connect one or more floors of non-air side building 18.

Figure 3:
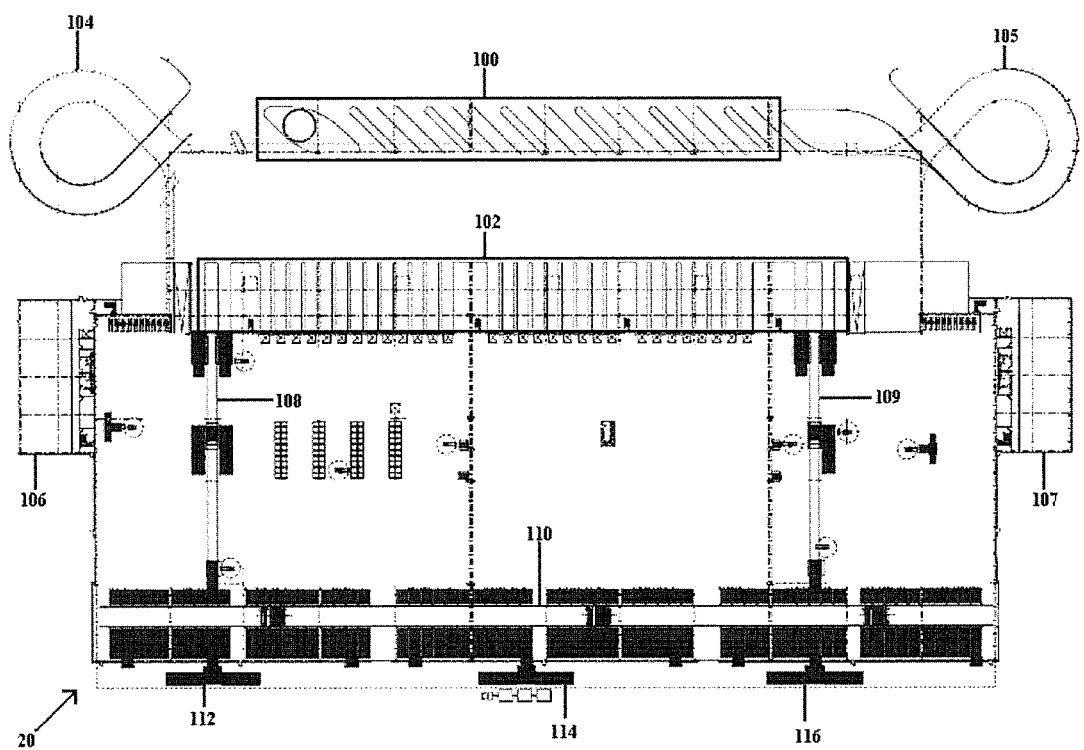
FIG. 3 depicts a detailed view of an import floor within an air side building of the security cleared space.

FIG. 3 depicts a contemplated interior of a level of air side building 20. Parking area 100 is adjacent to air side building 20. While FIG. 3 depicts parking area 100 adjacent to air side building 20, parking area 100 can be located remote from air side building 20. It is also contemplated that one or more levels of air side building 20 or non-air side building 18, shown in FIG. 1, can include one or more parking areas, such as underground parking areas. It is further contemplated that parking area 100 can contain trucks and other cargo vehicles that are not currently loading or unloading items or components from air side building 20.

First ramp 104 and second ramp 105 connect parking area 100 to truck docks 102, allowing trucks and other cargo vehicles to receive and unload items and components directly from air side building 20.

Items and components that enter or leave air side building 20 through truck docks 102 can be manually transported within air side building 20, loaded, or unloaded by personnel, or items and components can be transported using automated means.

FIG. 3 depicts first conveyer belt 108, second conveyer belt 109, and third conveyer belt 110 for transporting items and components within the depicted level of air side building 20. FIG. 3 further depicts first adjacent space 106 and second adjacent space 107 which include vertical conveyance means, such as ASRM vertical conveyance systems, for transporting items and components between levels of air side building 20. Any number of vertical conveyance means can be included within any levels of air side building 20.

At least one vertical conveyance means can transport items and components a floor of air side building 20 containing secure connector bridge 22, depicted in FIG. 1, to allow items and components to be transported to and from non-air side building 18.

Air side building 20 also includes first cargo way 112, second cargo way 114, and third cargo way 116, for receiving delivered items and components and for loading assembled or disassembled items into aircraft or other port authority vehicles.

Figure 4:
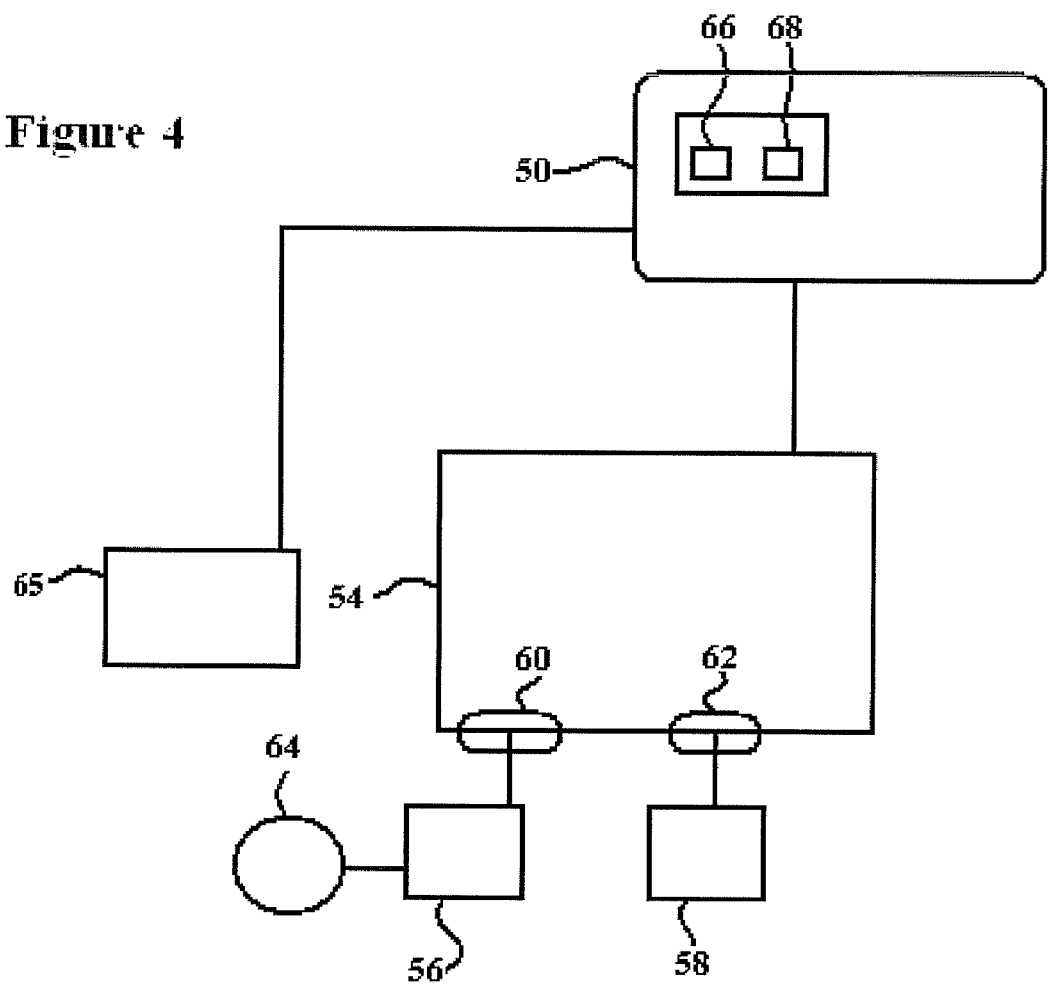
FIG. 4 depicts a schematic representation of a computer system usable with the present method.

Referring now to FIG. 4, a schematic depiction of an embodiment of a computer system useable with the present method is shown.

Processor 50, having data storage 52, is connected to a network 54. Network 54 can be the Internet, a local area network, a wide area network, a virtual private network, a satellite network, a cellular network, or other kinds of various networks or combinations thereof. It is contemplated that multiple processors or multiple networks can also be used with the present method.

First input device 56 and second input device 58 are depicted in communication with network 54 via a first gateway protocol 60 and a second gateway protocol 62. First input device 56 and second input device 58 can be personal digital assistants, bar code readers, keyboards, touch screens, or other tracking systems or devices, which may include a use of a microphone, a voice recognition system, or a biometric security keyed device. Any number of gateway protocols and input devices can be used, independently or simultaneously.

It is contemplated that first input device 56 and second input device 58 can access processor 50 over network 54, and both input data 66 into data storage 52 and retrieve data 66 from data storage 52. First input device 56 and second input device 58 can have one or more displays for viewing the data 66 retrieved from data storage 52. User 64 is depicted in communication with first input device 56.

Data storage 52 is depicted containing data 66, relating to one or more assembled items or components, which can be accessed by one or more users and input by one or more users.

Data 66 can include information relating to one or more components to be assembled, one or more assembled items to be stored or shipped, one or more assembled items to be disassembled, one or more screened components to be stored or shipped, and combinations thereof. Data 66 can also include data obtained by scanning labels, manifest clearance forms, and other similar information.

The processor is adapted to communicate with the manufacturer for assembly of the item, or the distribution of the item, and to communicate with the cargo facility operator or handler and the cargo plane or other aircraft being used for shipment.

Computer instructions 68 can be resident in memory, or data storage 52 of processor 50. Computer instructions 68 provide logistical instructions for application to items and components and can include but are not limited to instructions for final packaging and consolidation of items prior to shipment, customs clearance of the items prior to shipment, routing of consolidated and cleared items to be weighed, screening of cleared items prior to shipment, valuation of the items and applying insurance coverage to the items prior to shipment, and directing of the cleared, screened, weighed, valued and insured items to a particular aircraft or vehicle for transport.

Computer instructions 68 can also include instructions for automating the assembly or disassembly process, such as through use of mechanical equipment that can include smart pallets and a computer controlled processing unit. Computer instructions 68 can further include instructions for facilitating the assembly or disassembly process by displaying information, lists, messages, or instructions. Display 65 is depicted in communication with processor 50.

Figure 5:
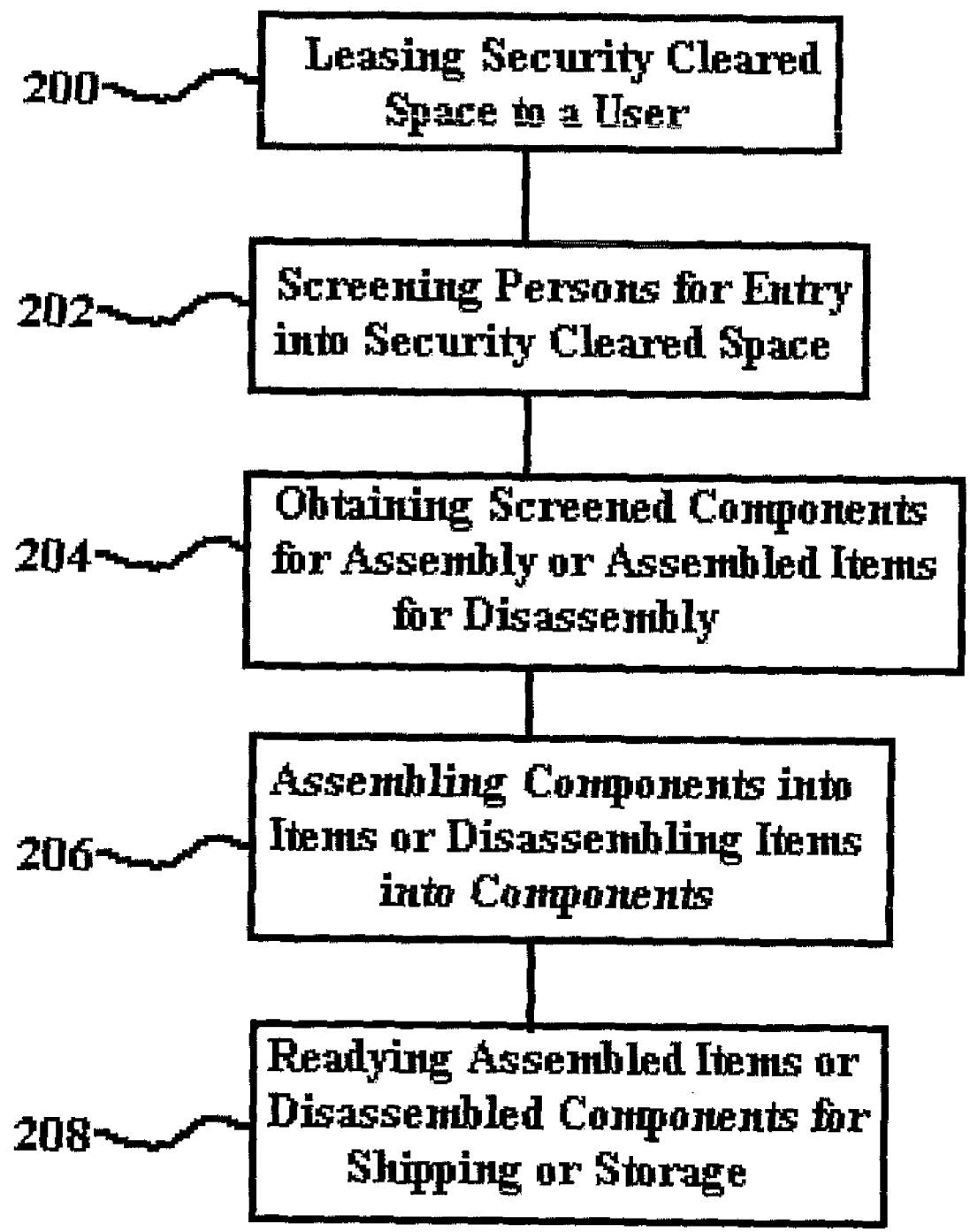
FIG. 5 depicts a flowchart of an embodiment of the present method for assembling and shipping an item or disassembling and shipping components using a security cleared space connected to an airport.

FIG. 5 depicts a flowchart of an embodiment of the present method for assembling and shipping an item or disassembling an item and shipping components using a security cleared space connected to a port authority.

As depicted in FIG. 5, step 200 is leasing a security cleared space to a user for assembly of an item. The security cleared space is connected to an airport and is a secured area meeting United States Transportation Security Administration and International Air Transport Association requirements for cargo security policies.

Step 202 is screening one or more persons for entering the security cleared space. The one or more persons can operate an assembly or disassembly line, which can include unloading items or components shipped to the security cleared site or readying assembled items or disassembled screened components for shipping from the security cleared site to a destination. It is contemplated that the screening of each person is performed according to United States Transportation Security Administration and International Air Transport Association requirements.

Step 204 is obtaining components for assembly or items for disassembly. Components for assembly or items for disassembly can be obtained from a land based vessel, a sea based vessel, an air based vessel, or combinations thereof. Components for assembly and items for disassembly can also be stored within the security cleared space, or manufactured within the security cleared space. It is contemplated that the components or assembled items delivered to the security cleared space are screened according to the United States Transportation Security Administration and International Air Transport Association requirements.

Step 206 is assembling items from components, or disassembling items into components. This can be done using an assembly line in the security cleared space, other assembly processes or equipment, or through an automated process, such as using smart pallets and a computer controlled processing unit.

Step 208 is readying the assembled item or disassembled screened components for shipment to a destination or for storage. This can be done by entering data related to the assembled item or disassembled screened components into a processor comprising computer instructions that direct the processor to direct the assembled items or disassembled components to a designated storage area or to an aircraft or other vehicle or vessel corrected to the security cleared space for shipment. Readying assembled items or disassembled screened components for shipment or storage can also include labeling or sealing one or more items or components, obtaining insurance coverage, or passing one or more physical customs inspections.

While these embodiments have been described with emphasis on the embodiments, it should be understood that within the scope of the appended claims, the embodiments might be practiced other than as specifically described herein.

What is claimed is:

1. A method for assembling and shipping at least one item using a security cleared space connected to a port authority, comprising the steps of:
    leasing the security cleared space to a user for assembly of at least one item selected from at least one computer, at least one cell phone, at least one silicon chip, or combinations thereof, wherein the security cleared space is connected to the port authority and is a secured area meeting United States Transportation Security Administration and International Air Transport Association requirements for cargo security policies;
    screening at least one person for entry to the security cleared space, wherein the screening of the at least one person is according to United States Transportation Security Administration and International Air Transport Association requirements;
    obtaining at least one component selected from at least one raw material, at least one silicon chip, silicon, or combinations thereof for assembly of the at least one item selected from at least one computer, at least one cell phone, at least one silicon chip, or combinations thereof, wherein the at least one component has been screened according to United States Transportation Security Administration an International Air Transport Association requirements;
    assembling the at least one component in the security cleared space, creating at least one item selected from at least one computer, at least one cell phone, at least one silicon chip, or combinations thereof in the security cleared space; and
    readying the at least one assembled item for shipment to a destination and moving the at least one item selected from at least one computer, at least one cell phone, at least one silicon chip, or combinations thereof directly to a designated storage area within the security cleared space for storage or to an aircraft connected to the security cleared space in compliance with United States Transportation Security Administration and International Air Transport Association requirements for shipment.

2. The method of claim 1, wherein the moving the at least one item selected from at least one computer, at least one cell phone, at least one silicon chip, or combinations thereof to a shipping vessel or to the designated storage area is by an automated process.

3. The method of claim 1, further comprising labeling the at least one item selected from at least one computer, at least one cell phone, at least one silicon chip, or combinations thereof using at least one label.

4. The method of claim 3, wherein the at least one label is a bar code, a radio frequency identification tag, a check character, text, or combinations thereof.

5. The method of claim 4, further comprising the step of scanning the at least one label to initiate insurance coverage from at least one insurance carrier for a member of the group: a manufacturer, an assembler, a broker, a forwarder, a shipper, a carrier, a customer, or combinations thereof.

6. The method of claim 3, wherein the at least one label comprises a manifest clearance form for enabling clearing of the at least one assembled item or a group of assembled items.

7. The method of claim 6, further comprising the step of scanning the manifest clearance form enabling clearing of the at least one item selected from at least one computer, at least one cell phone, at least one silicon chip, or combinations thereof from the security cleared space to a delivery point outside the security cleared space by transmitting the scanned manifest clearance form to a network and a designated internet protocol address.

8. The method of claim 7, further comprising the step of physically clearing a governmental customs inspection for enabling the at least one item selected from at least one computer, at least one cell phone, at least one silicon chip, or combinations thereof to pass out of the security cleared space to a shipping vessel for shipment to a specific destination, or to pass out of the security cleared space to the specific destination without use of the shipping vessel.

9. The method of claim 1, further comprising the step of sealing the at least one item selected from at least one computer, at least one cell phone, at least one silicon chip, or combinations thereof.

10. The method of claim 9, wherein the sealing is performed using at least one aluminum metal container, at least one cargo net, tamper proof tape, at least one tamper proof crate, or combinations thereof.

11. The method of claim 1, wherein the at least one person is a member of the group:
a line operator, a manager, a foreman, a forklift operator, an administrative personnel, a floor operator, a broker, a forwarder, a customs official, a treasury official, a drug enforcement agent and associated animals, a customs agent, a ground handling operator, a medical personnel, an engineer, a building engineer, a safety personnel, a leasing agent, an airport authority administrator, an airline official, a pilot or crew member, a load manager, a ramp operator, a ramp manager, a life, safety and code compliance official, a security officer, a police officer, a food delivery personnel, a cleaning personnel, a United States Department of Agriculture personnel, and combinations thereof.

12. The method of claim 1, wherein the port authority relates to an airport, a terminal for ships, a rail connection, a trucking facility, or another inter-modal facility.

13. A method for receiving at least one assembled item arriving by aircraft, disassembling the at least one assembled item, and shipping at least one component using a security cleared space connected to a port authority, comprising the steps of:
leasing the security cleared space to a user for disassembly of at least one item, wherein the security cleared space is connected to the port authority and is a secured area meeting United States Transportation Security Administration and International Air Transport Association requirements for cargo security policies;
screening at least one person for entry to the security cleared space, wherein the screening of the at least one person is according to United States Transportation Security Administration and International Air Transport Association requirements;
obtaining at least one item selected from at least one computer, at least one cell phone, at least one silicon chip, or combinations thereof from the shipping vessel, wherein the at least one item selected from at least one computer, at least one cell phone, at least one silicon chip, or combinations thereof has been screened according to the United States Transportation Security Administration and International Air Transport Association requirements;
disassembling the at least one item selected from at least one computer, at least one cell phone, at least one silicon chip, or combinations thereof into at least one component in the security cleared space and screening the at least one component using the at least one person, creating at least one screened component; and
readying the at least one screened component for shipment to a destination and moving the at least one screened component directly to a designated storage area within the security cleared space or to a vehicle connected to the security cleared space in compliance with United States Transportation Security Administration and International Air Transport Association requirements for shipment.

14. The method of claim 13, wherein the moving of the at least one screened component to the vehicle or to the designated storage area is by an automated process.

15. The method of claim 13, further comprising the step of labeling the at least one item selected from at least one computer, at least one cell phone, at least one silicon chip, or combinations thereof, each at least one screened component, a group of screened components, or combinations thereof using at least one label.

16. The method of claim 15, wherein the at least one label is a bar code, a radio frequency identification tag, a check character, text, or combinations thereof.

17. The method of claim 16, further comprising the step of scanning the at least one label to initiate insurance coverage from at least one insurance carrier for a member of the group: a manufacturer, an assembler, a broker, a forwarder, a shipper, a carrier, a customer, or combinations thereof.

18. The method of claim 16, wherein the at least one label comprises a manifest clearance form enabling clearing of the at least one screened component or the group of screened components.

19. The method of claim 18, further comprising the step of scanning the manifest clearance form enabling clearing of the at least one screened component or the group of screened components while en route from the security cleared space to a delivery point outside the security cleared space by transmitting the scanned manifest clearance form to a network and a designated internet protocol address.

20. The method of claim 19, further comprising the step of physically clearing a governmental customs inspection for enabling the at least one screened component or the group of screened components to pass out of the security cleared space to the vehicle for shipment to a specific destination, or to pass out of the security cleared space to a specific destination without use of the vehicle.

21. The method of claim 13, further comprising the step of sealing the at least one screened component or a group of screened components.

22. The method of claim 21, wherein the sealing is performed using at least one aluminum metal container, at least one cargo net, tamper proof tape, at least one tamper proof crate, or combinations thereof.

23. The method of claim 13, wherein the disassembling of the least one item selected from at least one computer, at least one cell phone, at least one silicon chip, or combinations thereof in the security cleared space is performed by an automated assembly line using smart pallets and a computer controlled processing unit.

24. The method of claim 13, wherein the step of disassembling the at least one item selected from at least one computer, at least one cell phone, at least one silicon chip, or combinations thereof further includes the step of manufacturing at least one manufactured component.

25. The method of claim 13, wherein the at least one person comprises a member of the group: a line operator, a manager, a foreman, a forklift operator, an administrative personnel, a floor operator, a broker, a forwarder, a customs official, a treasury official, a drug enforcement agent and associated animals, a customs agent, a ground handling operator, a medical personnel, an engineer, a building engineer, a safety personnel, a leasing agent, an airport authority administrator, an airline official, a pilot or crew member, a load manager, a ramp operator, a ramp manager, a life, safety and code compliance official, a security officer, a police officer, a food delivery personnel, a cleaning personnel, a United States Department of Agriculture personnel, and combinations thereof.

26. The method of claim 13, wherein the port authority relates to an airport, a terminal for ships, a rail connection, a trucking facility, or another inter-modal facility.

* * * * *